(12) United States Patent
Nosrati

(10) Patent No.: US 8,990,895 B2
(45) Date of Patent: Mar. 24, 2015

(54) METHOD AND APPARATUS FOR A PORTABLE WIRELESS SECURITY DEVICE

(71) Applicant: Farhad David Nosrati, Encino, CA (US)

(72) Inventor: Farhad David Nosrati, Encino, CA (US)

( * ) Notice: Subject to any disclaimer, the term of this patent is extended or adjusted under 35 U.S.C. 154(b) by 71 days.

(21) Appl. No.: 14/011,750

(22) Filed: Aug. 27, 2013

(65) Prior Publication Data
US 2014/0123224 A1 May 1, 2014

Related U.S. Application Data

(60) Provisional application No. 61/704,492, filed on Sep. 23, 2012.

(51) Int. Cl.
- H04W 12/06 (2009.01)
- G06Q 20/32 (2012.01)
- G06Q 20/40 (2012.01)
- H04L 29/06 (2006.01)
- H04W 4/00 (2009.01)

(52) U.S. Cl.
CPC ........... *H04W 12/06* (2013.01); *G06Q 20/3278* (2013.01); *H04L 63/0853* (2013.01); *H04L 63/0861* (2013.01); *H04W 4/008* (2013.01); *H04L 2463/082* (2013.01); *G06Q 20/4093* (2013.01)
USPC .......................................................... 726/3

(58) Field of Classification Search
None
See application file for complete search history.

(56) References Cited

U.S. PATENT DOCUMENTS

| | | | |
|---|---|---|---|
| 8,699,713 B1 * | 4/2014 | Rivest et al. ................. | 380/277 |
| 2011/0028091 A1 * | 2/2011 | Higgins et al. .............. | 455/41.2 |
| 2011/0238995 A1 * | 9/2011 | Blanco et al. ................ | 713/173 |
| 2013/0111555 A1 * | 5/2013 | Leneel ............................ | 726/4 |
| 2013/0268766 A1 * | 10/2013 | Schrecker .................... | 713/185 |
| 2014/0273957 A1 * | 9/2014 | Reitz ............................ | 455/411 |

* cited by examiner

*Primary Examiner* — Kenny Lin

(57) ABSTRACT

A portable wireless security device (WSD) along with methods of use for providing a multi-factor authentication process for authorizing RFID payment transactions, online processes and email correspondences made by a mobile device.

21 Claims, 11 Drawing Sheets

WIRELESS SECURITY DEVICE (WSD)
HARDWARE STRUCTURE

100

WIRELESS SECURITY DEVICE (WSD)
SECURE MOBILE DEVICE ACCESS

500

WIRELESS SECURITY DEVICE (WSD)
REMOTE TRANSACTION PROCESS

600

WIRELESS SECURITY DEVICE (WSD)
DISPLAY EMAIL AND TEXT MESSAGES

800

WIRELESS SECURITY DEVICE (WSD)
ATM/BANKING CENTER ACCESS

METHOD AND APPARATUS FOR A PORTABLE WIRELESS SECURITY DEVICE

BACKGROUND OF INVENTION

1. Field of the Invention

The present invention relates to a wireless portable security device along with several method of use for providing an automated multi-factor authentication for RFID payment process and online transactions including email correspondence on mobile devices as well secure access to Automated Teller Machines (ATM) and local and remote access login devices. The security device will wirelessly pair with a mobile device, and while positioned in the close proximity of the mobile device, will authenticate various electronic transactions made via the paired mobile device.

2. Description of Prior Art

Mobile devices such as cellular phones and tablet computers are often used to perform electronic transactions such as RFID payment process, as well as online financial transactions, personal and private information accesses, web-based purchases of products and email correspondences. To authenticate such accesses and transactions on mobile devices, various methods and devices are being used.

One approach is to place biometric scanners such as fingerprint readers on the mobile device itself. One issue with this approach is that a person's fingerprint information can be hi-jacked via malicious software that might have been inadvertently loaded and be operating on the mobile device. The other drawback for this approach is the lack of convenience to the legitimate user of the mobile device, as he or she would then be required to constantly swipe their fingerprint for scanning and validation prior to performing a transaction on their mobile device.

Another approach is to enter a password prior to each RFID transaction and online access by the mobile device. This approach also presents a deficiency as it a) is vulnerable to being hi-jacked via malicious software that might have been inadvertently loaded on the mobile device and b) is inconvenient for user to have to enter a password on each RFID transaction.

Yet another approach involves the use of a secondary portable device with an LCD display. The device constantly displays a sequence of numbers that is randomly generated and time-synchronized with an outside base station. The displayed number gets updated on a fixed interval of times, typically every 60 seconds. The user has to enter that number on the mobile device prior to performing a transaction. The outside base station then checks the validity of the randomly generated number being sent by the mobile device.

Yet another approach involves the use of another secondary portable device with an LCD display. The said device is capable of receiving messages such as passwords, wirelessly from a base-station. Once the user initiates an online transaction, the corresponding host station will send a secondary and often temporarily password to the portable device which the user has to enter on their mobile device prior to performing the transaction.

Automated Teller Machines (ATM) and banking centers typically utilize an ATM card in conjunction with a password or PIN number as a two factor authentication process to grant account access to customers. This approach for two factor authentication solution poses major security issue as the PIN number can be easily hijacked and the ATM card can be stolen or replicated.

SUMMARY OF THE INVENTION

The present invention comprises of a small and portable wireless security device (WSD) capable of wirelessly pairing with a mobile device; and utilizing the wireless link established between the WSD and the paired mobile device, to constantly monitor and detect the presence of the said WSD security device within the close proximity of the mobile device, in order to a) authenticate access to the paired mobile device, b) authenticate all remote and online transactions performed by the mobile device including but not limited to RFID payment transactions and online web-based services such as financial transactions and email correspondences. This innovative invention provides an automatic and transparent two-factor authentication process for all online processes and transactions performed by the mobile device without requiring any additional interactions form the user.

The current invention offers a unique and innovative solution for a bi-directional, multi-factor authentication process that can a) secure access to the mobile device itself and b) secure all processes performed by the mobile device including but not limited to RFID transaction, web-based online accesses, email access and transactions, c) provide secure remote access to outside computing devices and d) locate the mobile device paired with the wireless security device. Once the wireless link is established between the Security Device and the paired mobile device such as a smart phone, an application software running on the mobile device, constantly monitors the presence of the security device within its close proximity of the mobile device and authorizes RFID payment transactions, as well as online services such as financial transactions and email correspondences, doing so only while the security device is being present.

Current invention further offers a secure multi-factor authentication solution for accessing account information at Automated Teller Machines (ATM) and banking centers, replacing the traditional ATM card access. An embedded biometric reader along with a wireless transceiver is utilized to wirelessly authenticate authorized account holders.

Current invention further offers a secure multi-factor authentication solution for various login devices including but not limited to time and attendance devices and network access devices.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

It should be noted that references to "an," "one," or "various" embodiments in this disclosure are not necessarily to the same embodiment, and such references contemplate more than one embodiment.

Disclosed herein and illustrated in FIGS. 1 through 11 is the present invention method and apparatus Wireless Security Device 10 for providing a two factor authentication solution to mobile devices and Automatic Teller Machines (ATM) and banking centers.

Figure 1:
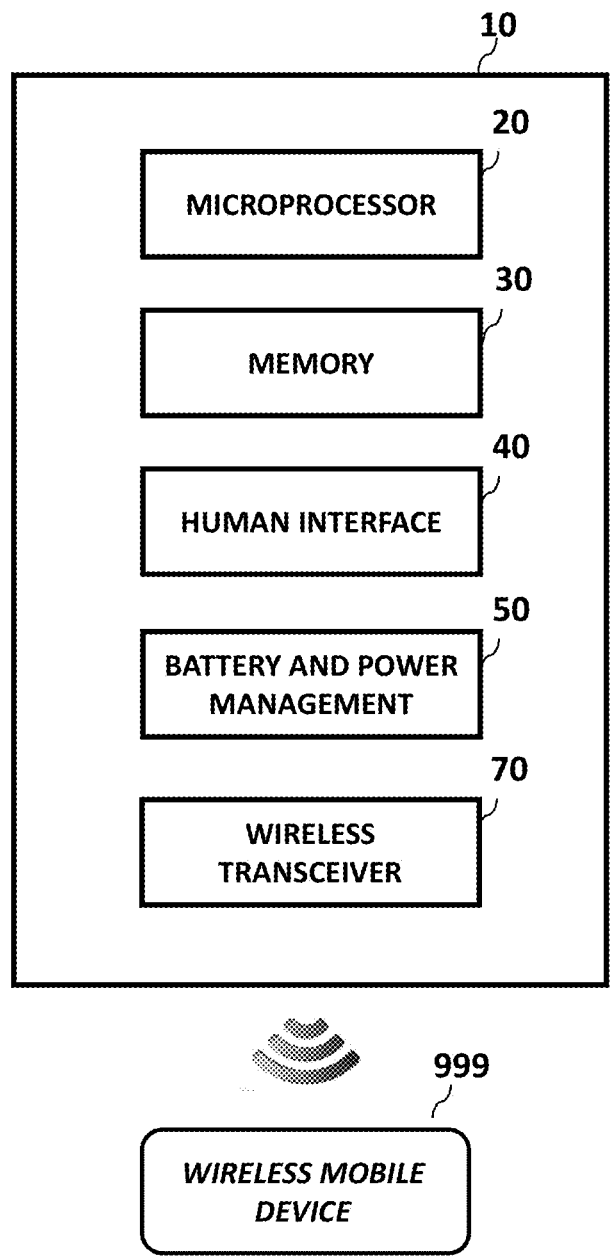
FIG. 1 is a block diagram of a preferred embodiment of the hardware architecture of the present invention Wireless Security Device (WSD)
Figure 2:
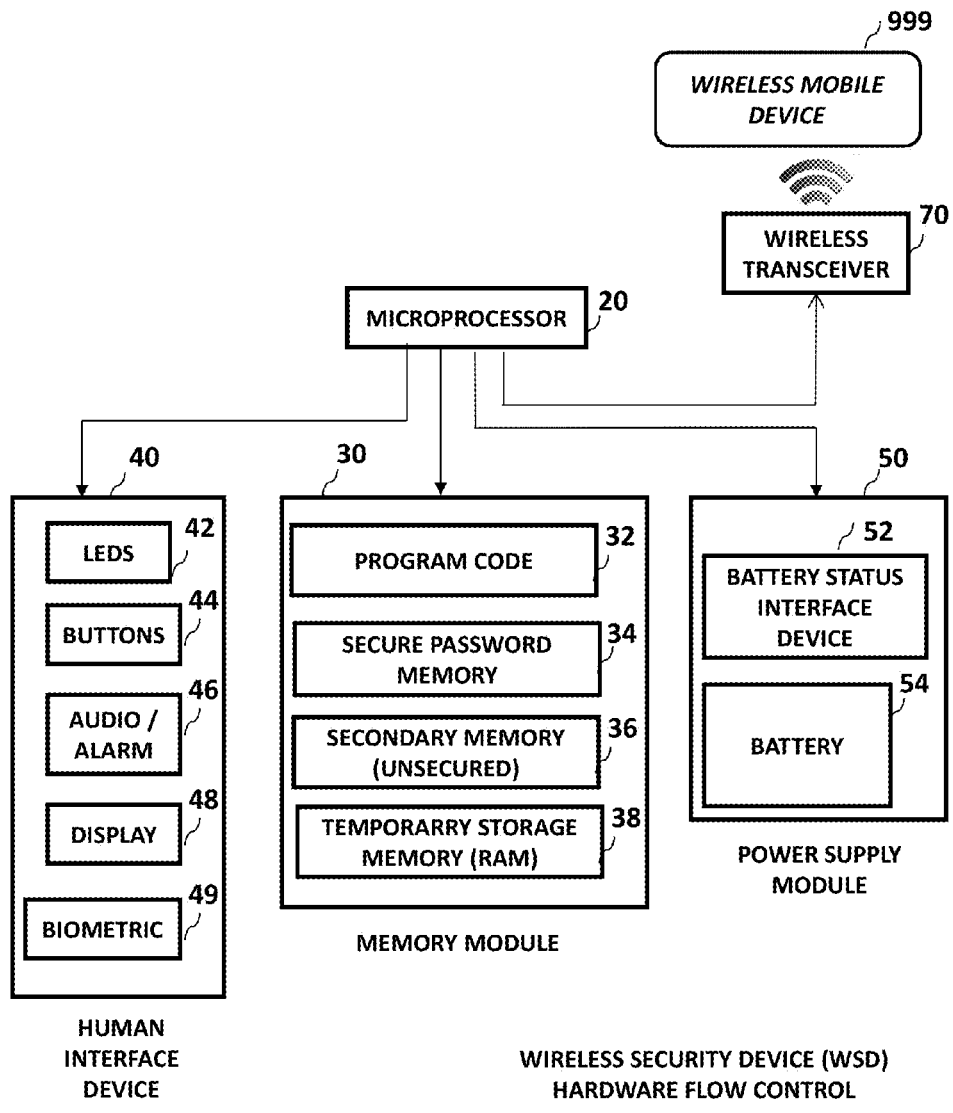
FIG. 2 is a detail illustration of the hardware architecture shown in a block diagram of a preferred embodiment illustrating the hardware flow control of the present invention Wireless Security Device (WSD)

The present invention has a process block diagram 100, which is illustrated in FIG. 1 and in detail in FIG. 2, wherein a wireless mobile device 999 can be paired with the Wireless Security Device WSD 10, in order to provide secure access to the mobile device 999, as well as secure access to all online transactions performed by the mobile device. The hardware architecture is contained within some type of appropriate housing, not shown. The present invention 10 includes a microprocessor 20 that provides the computing power, a wireless transceiver 70 will communicate with the outside mobile device 999 via telemetry. User Interface module 40 of the current invention 10 includes a display unit 48 for viewing various prompts and messages. User interface module 40 also includes a plurality of buttons and switches 44, an audio device 46 is available to prompt the operator of the status of the paring process with the mobile device 999. User interface module 40 also includes a biometric reader 49 to securely identify the authorized user of the Wireless Security Device WSD 10. A number of light emitting diodes (LEDs) 42 will also provide the operator with visual feedback of the status of the current invention. Battery power management 50 contains a rechargeable battery 54 that provides the power source for the WSD device 10, and the supporting circuitry 52 provides feedback to the status of the battery-charge available. Memory module 30, provides storage area for the internal programming as well as storing the secure pairing password information.

The present invention Wireless Security Device 10 has a hardware flow control 200, which is illustrated in detail in FIG. 2. Wireless transceiver 70 will communicate with the outside mobile device 999 via telemetry and pairs with the mobile device. Audio alarm 46, Status LEDs 42 and display unit 48 provide audio and visual indication of the status of the pairing process. Microprocessor 20 saves the secure pairing password in the primary memory 34 for the purpose of authenticating authorized WSD with the mobile device. User configurations and default menu settings and preferences are then saved in the secondary memory 36. Biometric sensing module 49 is utilized to authenticate authorized users access to the WSD device 10.

Figure 3:
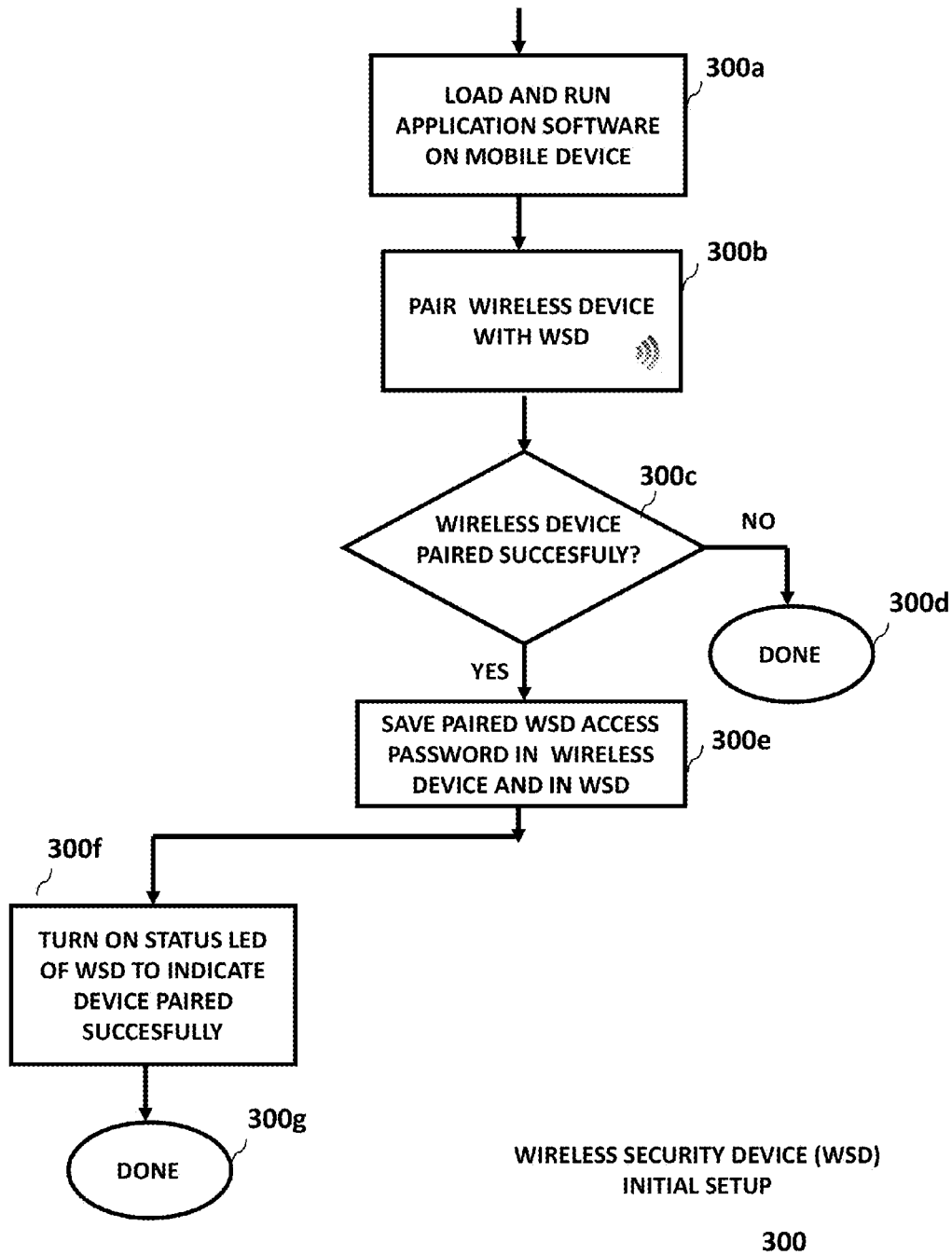
FIG. 3 is a flow chart diagram of a preferred embodiment of the software flow control of the initial setup of the present invention Wireless Security Device (WSD)

Referring now to FIG. 3, there is shown a detail of a software multi-task flow diagram 300 for the initial setup process of the wireless security device (WSD) 10. A software application 300a is loaded and activated on the mobile device which is capable of pairing with one or more Wireless security devices 300b. The status of the pairing process is then checked 300c. If the WSD was not paired successfully with the mobile device, the initial setup process is terminated. In the event that WSD was successfully paired with the mobile device, a unique password associated with the paired WSD is then saved in the mobile devices memory as well as the Wireless Devices memory 300e and status LEDs of the WSD are led to indicate successful pairing 300f. The initial setup process is then completed 300g and access to the mobile device is secured through the use of the wireless security device (WSD) 10.

Figure 4:
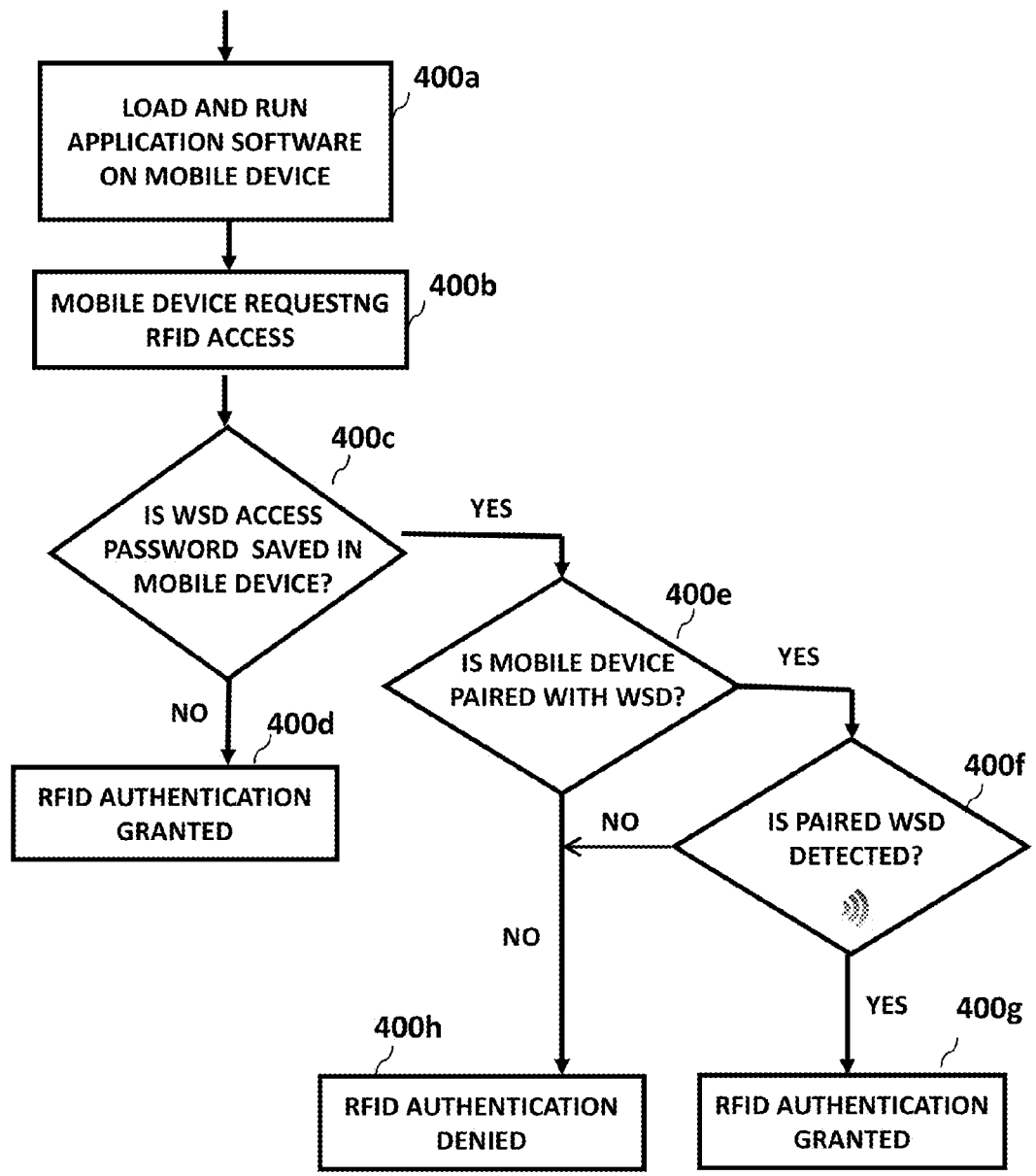
FIG. 4 is a flow chart diagram of a preferred embodiment of the software flow control for RFID authorization process of the present invention Wireless Security Device (WSD)

Referring to FIG. 4, there is shown a detail of a software flow diagram 400 for the RFID authorization process. A software application 400a is loaded and activated on the mobile device which is capable of communicating with the paired WSD device 10 via telemetry. Once the mobile device initiates an RFID authorization request 400b, the mobile device internal memory is then searched for a WSD access password 400c. In the event that WSD access password is not discovered in the phones internal memory, indicating no WSD has been paired with the mobile device, RFID authorization is granted 400d without requiring a second authentication process through the use of the WSD. If WSD secure password is discovered in the internal memory of the mobile device, the mobile devices searches for the paired WSD via telemetry 400f. If the paired WSD is not found within close proximity of the mobile device, then RFID authorization is denied 400h. If the paired WSD is found within close proximity of the mobile device, then RFID authorization is granted 400g.

Figure 5:
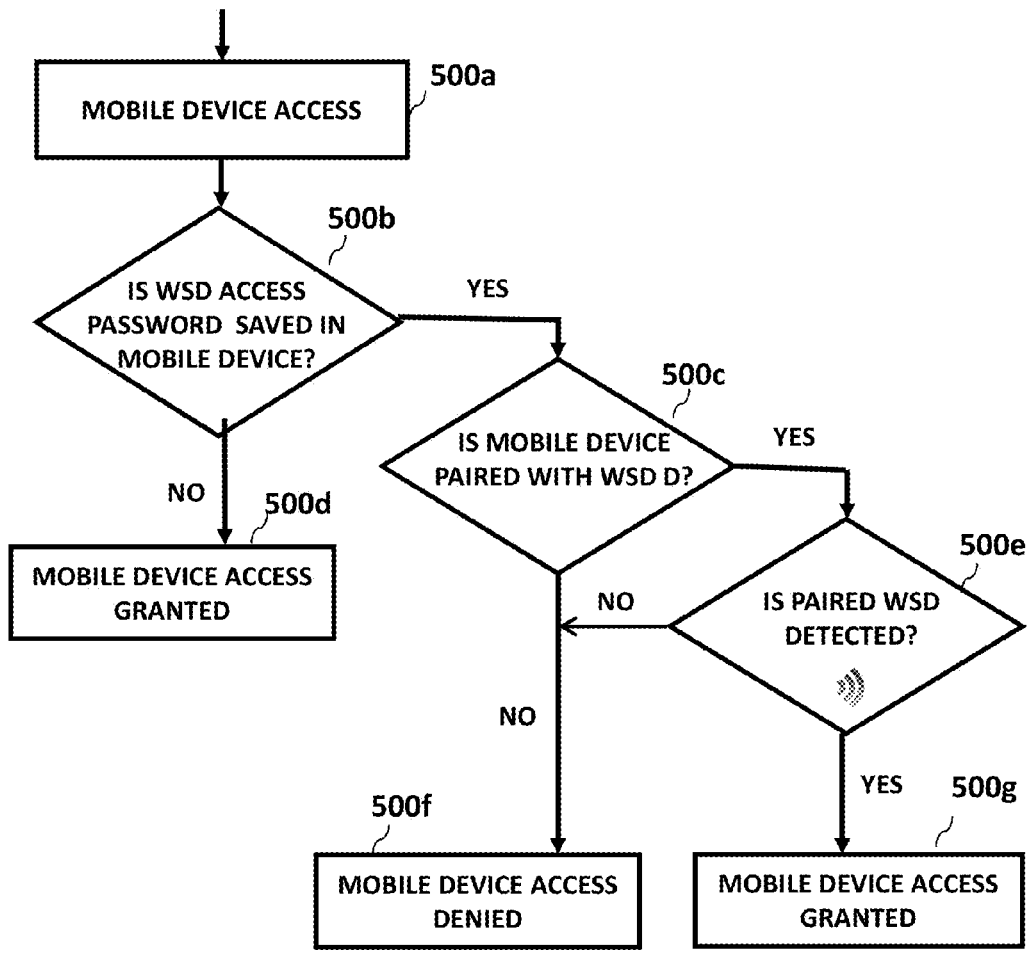
FIG. 5 is a flow chart diagram of a preferred embodiment of the software flow control for secure mobile device access process of the present invention Wireless Security Device (WSD)

Referring to FIG. 5, there is shown a detail of a software flow diagram 500 for the mobile phone access. In the event of access to the mobile device 500a, mobile device internal memory is searched for a WSD access password 500b. If the WSD access password is not discovered in the phones internal memory, indicating no WSD has been paired with the mobile device, access to the mobile device is granted 500d. If WSD access password is discovered in the internal memory of the mobile device, the mobile devices searches for the paired WSD via telemetry 500c. If the paired WSD is not found within close proximity of the mobile device, then access to the mobile is denied 500f. If the paired WSD is found within close proximity of the mobile device, then mobile device access is granted 500g.

Figure 6:
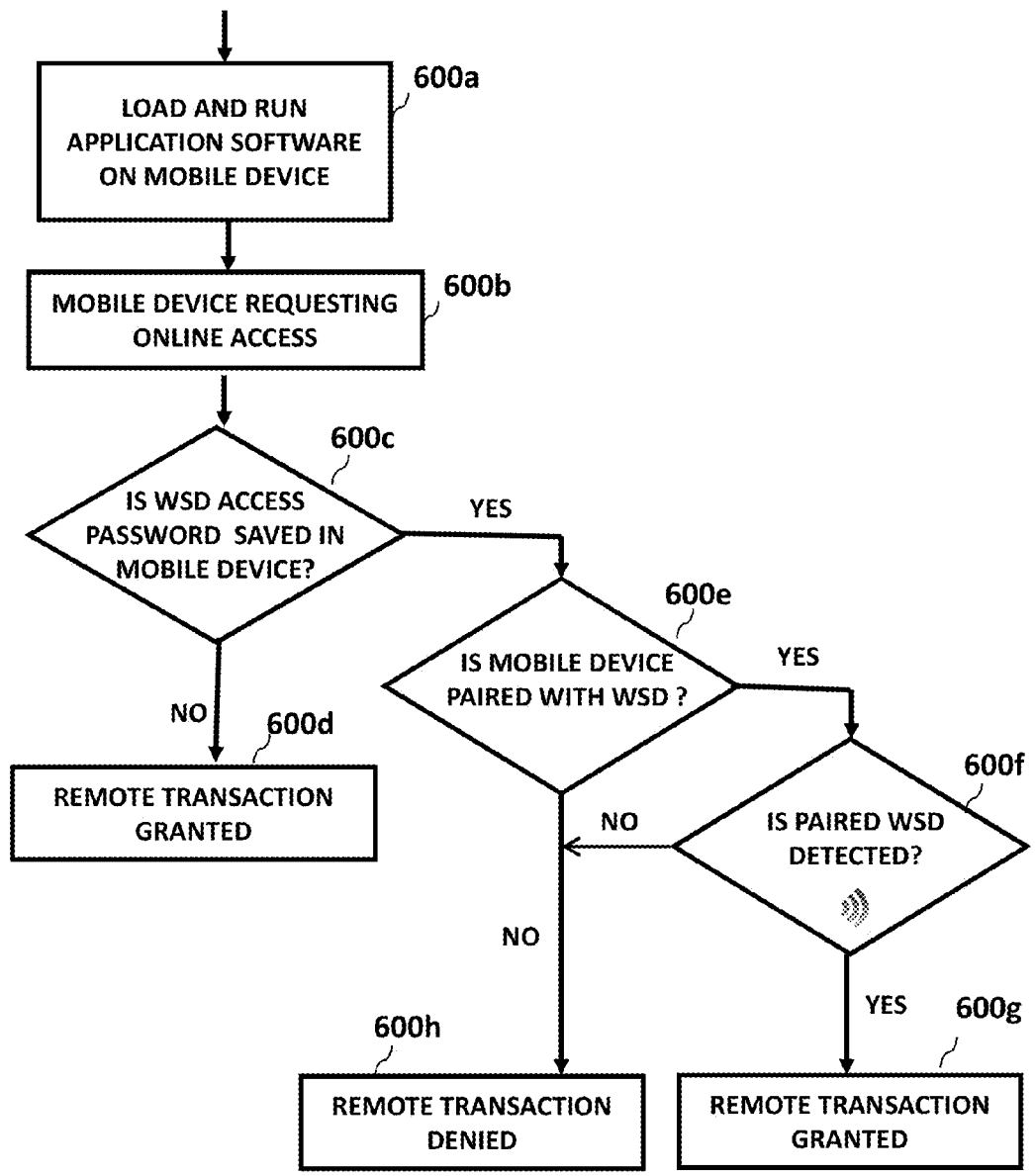
FIG. 6 is a flow chart diagram of a preferred embodiment of the software flow control for remote transaction process of the present invention Wireless Security Device (WSD)

Referring to FIG. 6, there is shown a detail of a software flow diagram 600 for the remote transaction process. A software application 600a is loaded and activated on the mobile device which is capable of communicating with the paired WSD device 10 via telemetry. Once the mobile device initiates remote transaction request 600b, the mobile device internal memory is then searched for a WSD access password 600c. In the event that WSD access password is not discovered in the phones internal memory, indicating no WSD has been paired with the mobile device, remote transaction is granted 600d. If WSD secure password is discovered in the internal memory of the mobile device, the mobile devices searches for the paired WSD via telemetry 600f. If the paired WSD is not found within close proximity of the mobile device, then remote transaction is denied 600h. If the paired WSD is found within close proximity of the mobile device, then remote transaction is granted 600g.

Figure 7:
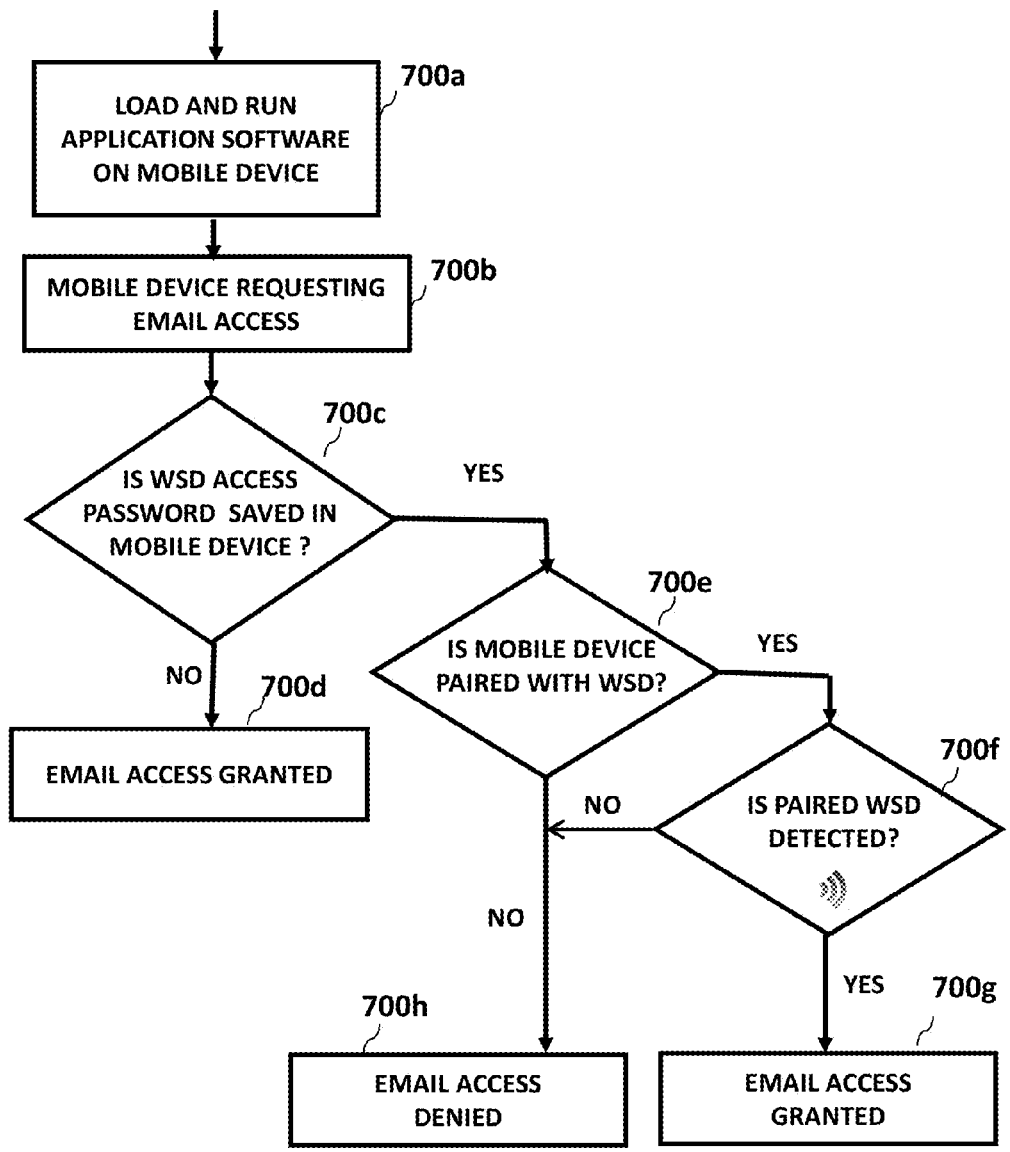
FIG. 7 is a flow chart diagram of a preferred embodiment of the software flow control for email access process of the present invention Wireless Security Device (WSD)

Referring to FIG. 7, there is shown a detail of a software flow diagram 700 for the email access process. A software application 700a is loaded and activated on the mobile device which is capable of communicating with the paired WSD device 10 via telemetry. Once the mobile device initiates email access request 700b, the mobile device internal memory is then searched for a WSD access password 700c. In the event that WSD access password is not discovered in the phones internal memory, indicating no WSD has been paired with the mobile device, email access is granted 700d. If WSD secure password is discovered in the internal memory of the mobile device, the mobile devices searches for the paired WSD via telemetry 700f. If the paired WSD is not found within close proximity of the mobile device, then email access is denied 700h. If the paired WSD is found within close proximity of the mobile device, then email access is granted 700g.

Figure 8:
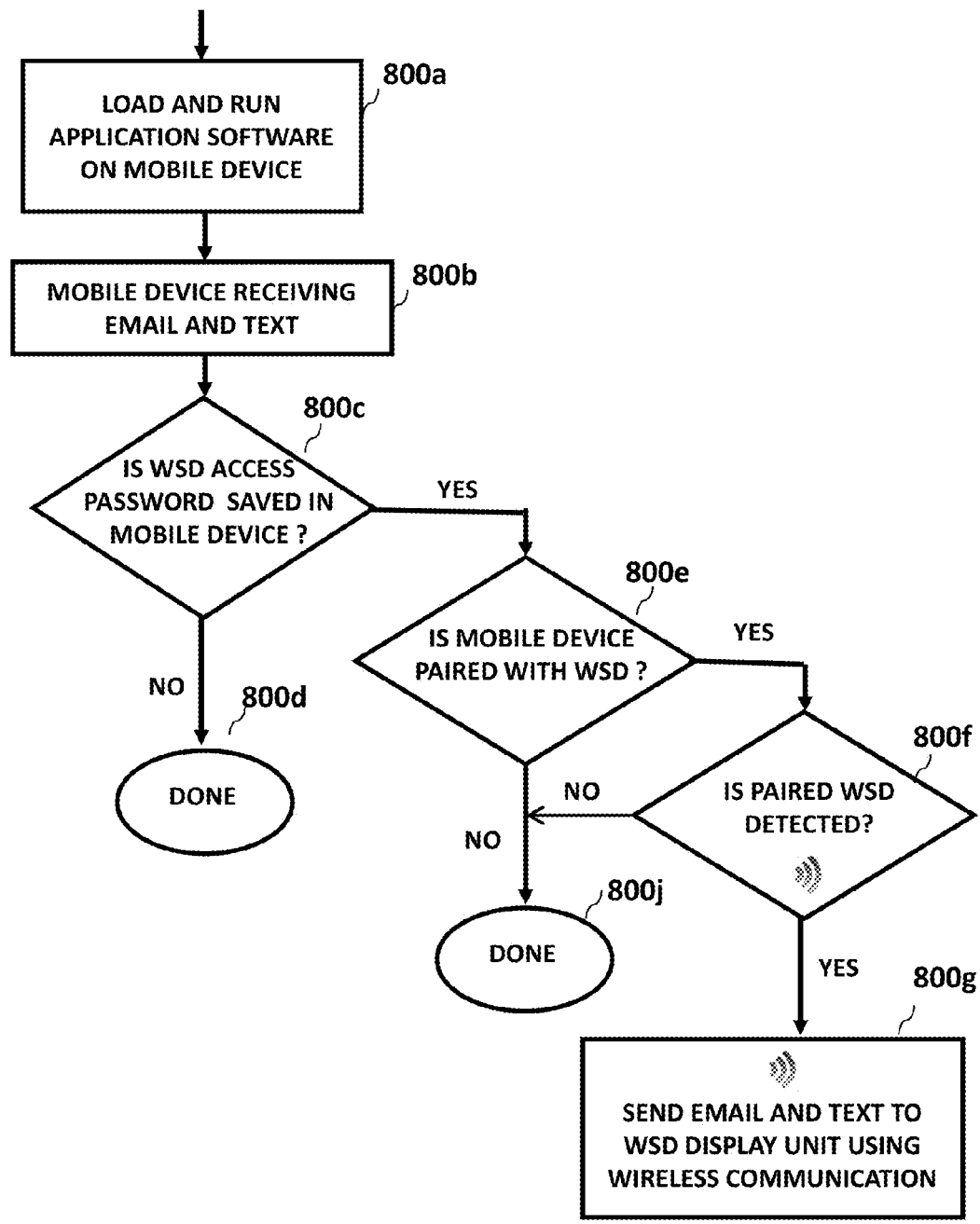
FIG. 8 is a flow chart diagram of a preferred embodiment of the software flow control for display email and text messages process of the present invention Wireless Security Device (WSD)

Referring to FIG. 8, there is shown a detail of a software flow diagram 800 for the display email and text messages process. A software application 800a is loaded and activated on the mobile device which is capable of communicating with the paired WSD device 10 via telemetry. Once the mobile device receives emails or text message information 800b, the mobile device internal memory is then searched for a WSD access password 800c. In the event that WSD access password is not discovered in the phones internal memory, indicating no WSD has been previously paired with the mobile device, then email and text message transmission to WSD is denied 800d. If WSD secure password is discovered in the internal memory of the mobile device, the mobile devices searches for the paired WSD via telemetry 800f. If the paired WSD is not found within close proximity of the mobile device, then email and text message transmission to WSD is denied 800j. If the paired WSD is found within close proximity of the mobile device, then email and text messages are sent to the WSD via telemetry to be displayed 800g.

Figure 9:
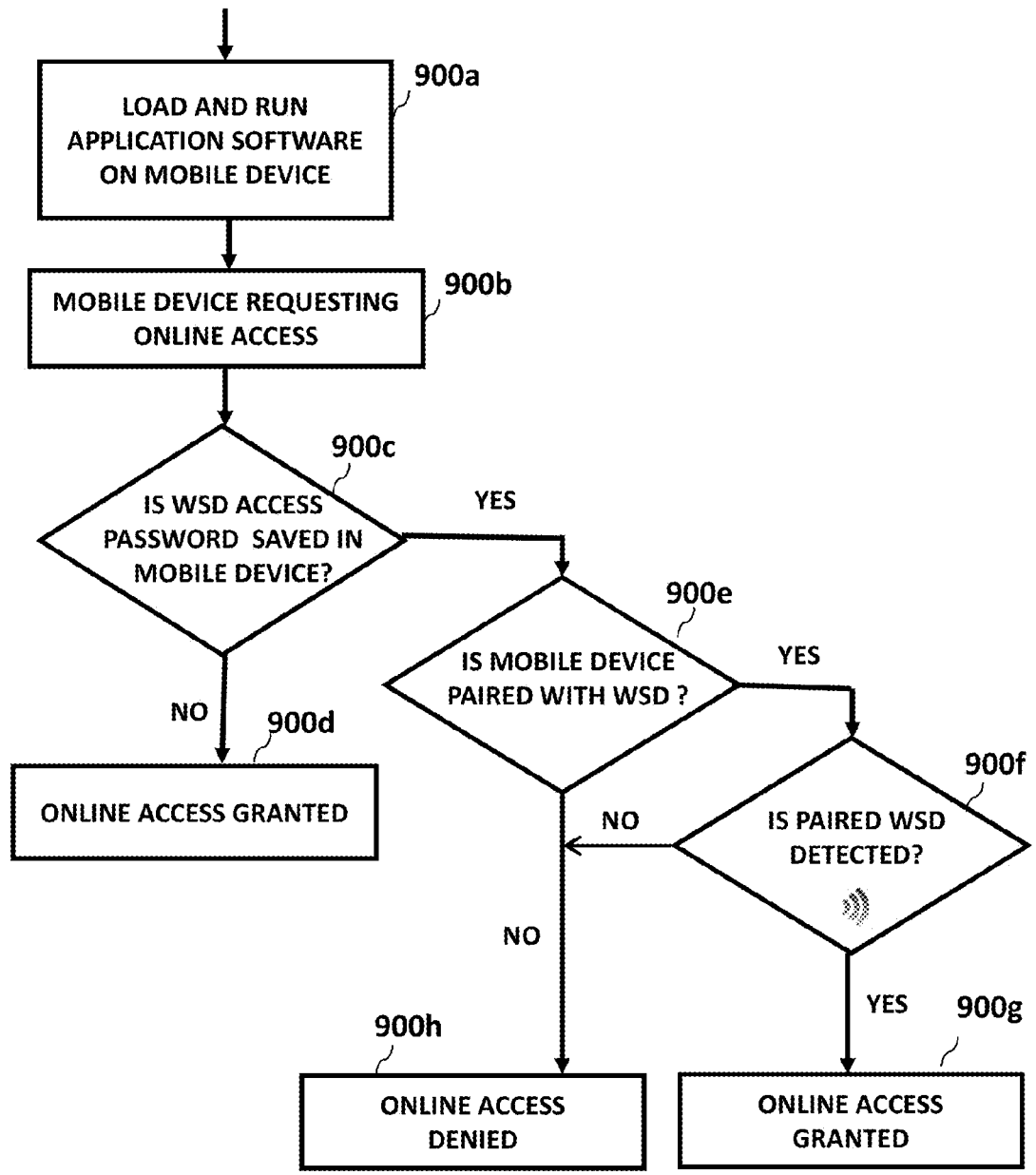
FIG. 9 is a flow chart diagram of a preferred embodiment of the software flow control for online access process of the present invention Wireless Security Device (WSD)

Referring to FIG. 9, there is shown a detail of a software flow diagram 900 for the online access process. A software application 900a is loaded and activated on the mobile device which is capable of communicating with the paired WSD device 10 via telemetry. Once the mobile device initiates email access request 900b, the mobile device internal memory is then searched for a WSD access password 900c. In the event that WSD access password is not discovered in the phones internal memory, indicating no WSD has been paired with the mobile device, online access is granted 900d. If WSD secure password is discovered in the internal memory of the mobile device, the mobile devices searches for the paired WSD via telemetry 900f. If the paired WSD is not found within close proximity of the mobile device, then online access is denied 900h. If the paired WSD is found within close proximity of the mobile device, then online access is granted 900g.

Figure 10:
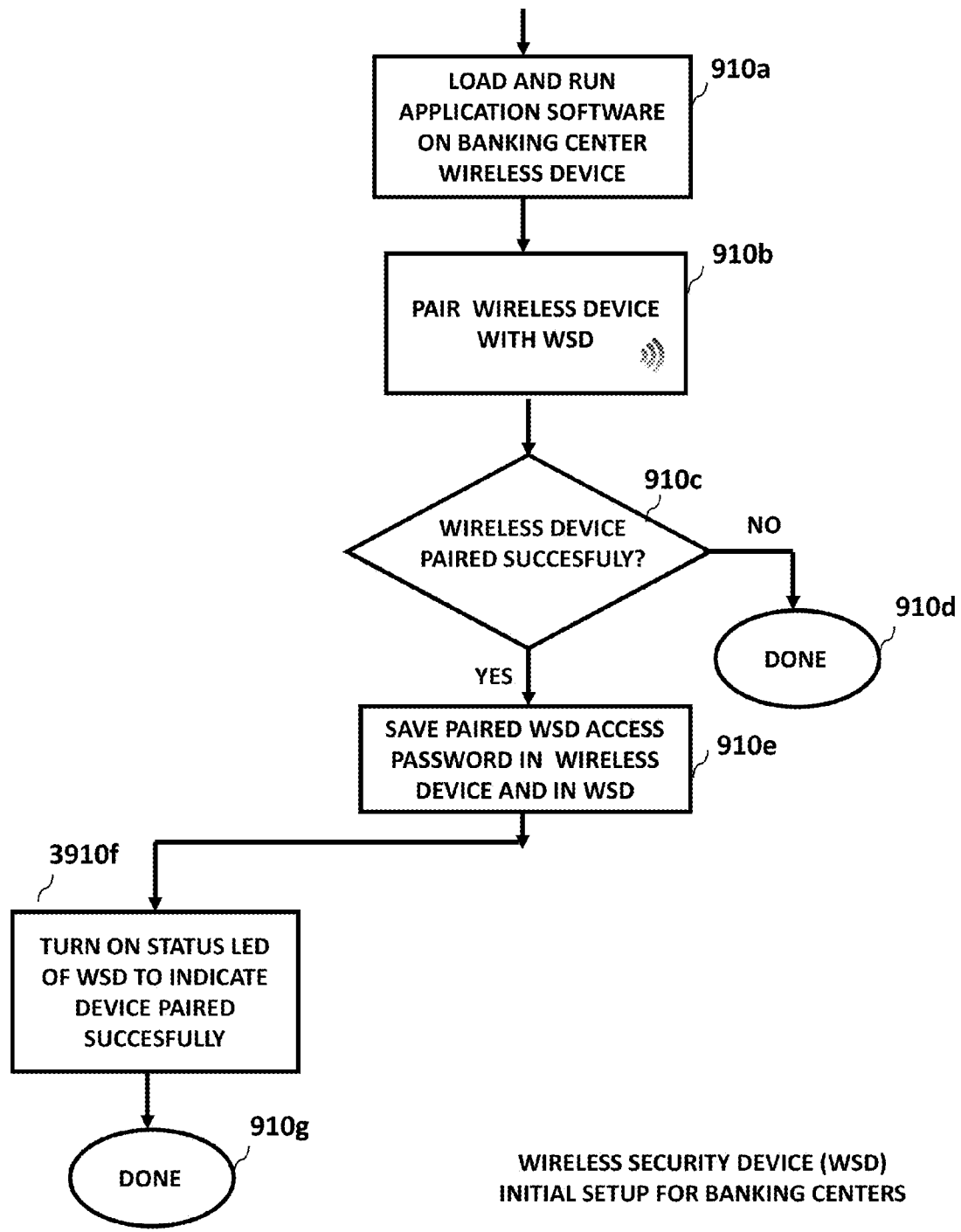
FIG. 10 is a flow chart diagram of a preferred embodiment of the software flow control for WSD pairing password assignment at the banking center.

Referring to FIG. 10, there is shown a detail of a software multi-task flow diagram 910 for the initial setup process of the wireless security device (WSD) 10 at the banking center for use with ATM and other account access devices. A software application 910a is loaded and activated on the bank's computer network. A WSD associated with each individual account is then paired with the bank computer 910b. The status of the pairing process is then checked 910c. If the WSD was not paired successfully with the banking computer, the initial setup process is terminated 910d. In the event that WSD was successfully paired with the bank computer, a unique password associated with the paired WSD is then saved in the bank's computer network's storage area as well as in the WSD internal memory 910e and status LEDs of the WSD are led to indicate successful pairing 910f. The initial setup process is then completed 910g and access to the bank's ATM and other account login devices is secured through the use of the wireless security device (WSD) 10.

Figure 11:
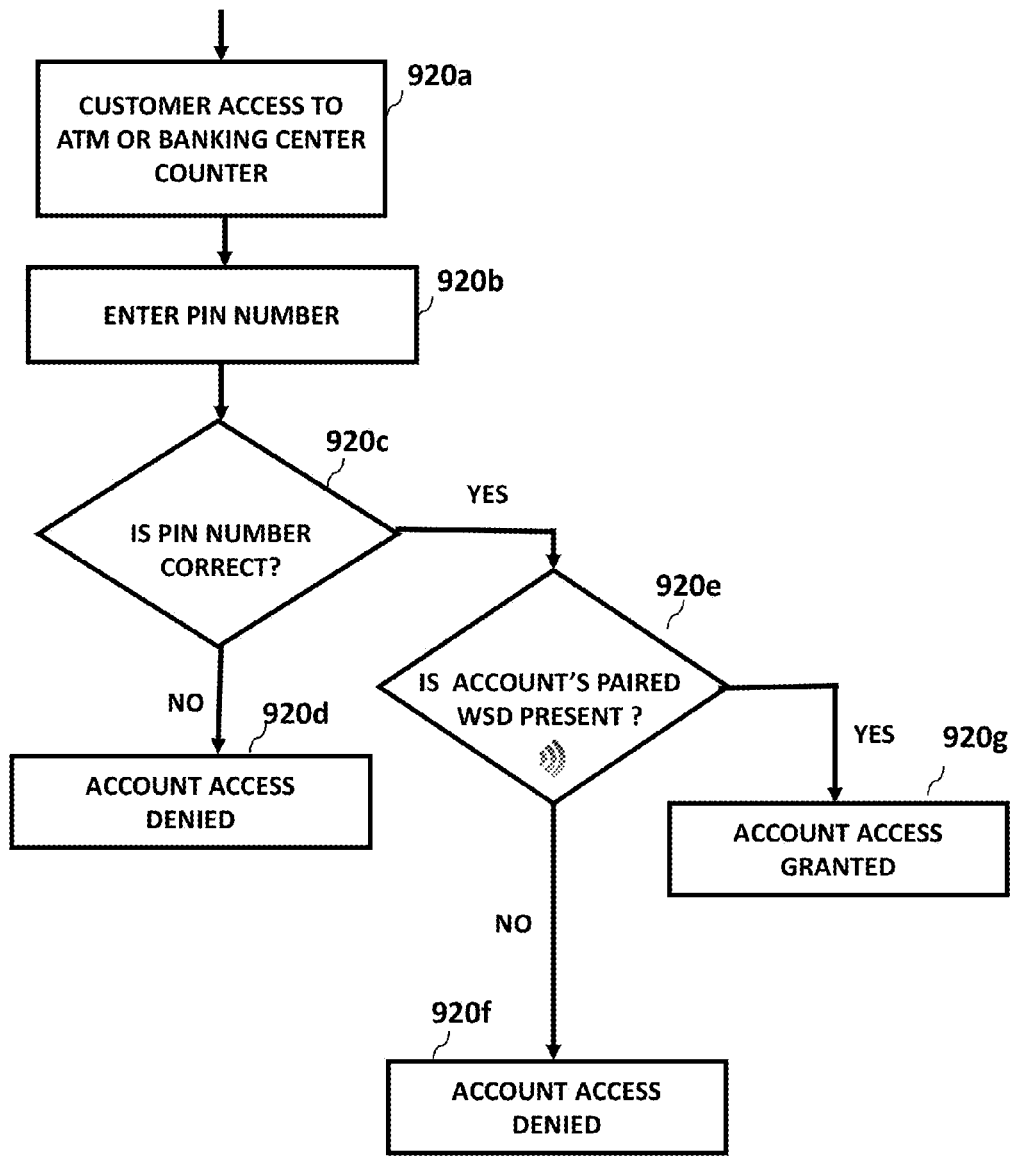
FIG. 11 is a flow chart diagram of a preferred embodiment of the software flow control for WSD account access at the ATM and banking center.

Referring to FIG. 11, there is shown a detail of a software flow diagram 920 for account access at ATM or banking center using WSD device 10. Customer access to an ATM or banking center counter 920a will require inputting customer PIN number 920b. The validity of the customer PIN number is then checked and verified 920c. If inputted customer PIN number is not correct, access to the account is denied 920d. In the event that the PIN number entered is correct, the ATM or the wireless input device at the Banking center wirelessly searches for a WSD with matching pairing security password assigned to the customer requesting access the account 920e. If the WSD with matching pairing password is not detected, account access is denied 920f. In the event that a WSD with the matching pairing password to the one assigned to the customer is detected within close proximity of the ATM or wireless input device at the banking center counter, access to customer account is granted 920g.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

It is an object of the invention to provide a wireless security device (WSD) for authenticating RFID transactions made by a wireless mobile device which is paired with and is located within close proximity of the said paired WSD which comprises a CPU, Program memory, Storage memory, Wireless connectivity, LED, buttons, Audio alarm, Display, and a Biometric reader.

What is claimed is:

1. A wireless security device (WSD) for creating a multi-factor authentication which supplements a first wireless device comprising at least a first level of authentication and the WSD being the second device providing at least a second level of authentication, the wireless security device comprises:
   a. a processor to at least process, validate and store multiple-factor authentication;
   b. a transceiver for transmitting a secure wireless pairing information of the WSD to a first wireless device;
   c. a memory comprised of at least one module, said memory at least stores the secure pairing information of the WSD;
   d. an audible alarm indicating various WSD status, the status at least comprises pairing status, close-proximity indicator and battery condition;
   e. a display unit indicating at least the pairing status, the close-proximity indicator and the battery condition;
   f. a second factor authentication sensor, the second factor authentication validates at least presence of the authorized user possessing the paired WSD device to the first wireless device; and g. wherein the processor further performs the pairing process between the WSD and the first wireless device, stores the pairing information in the memory and continuously communicates with the first wireless device via telemetry to validate the presence of the WSD in the close proximity of the first wireless device.

2. The wireless security device of claim 1, wherein the first device is a mobile device such as a smart phone or tablet computer.

3. The wireless security device of claim 1, wherein the first device is an Automated Teller Machine (ATM) used by banks and financial institutions.

4. The wireless security device of claim 1, wherein the first device is a wireless login device, time and attendance device, or identification input device for identifying individuals and granting access to account information.

5. The wireless security device of claim 2, wherein the mobile device is used to perform RFID purchase.

6. The wireless security device of claim 2, wherein the mobile device is used to access email accounts and perform email correspondence.

7. The wireless security device of claim 2, wherein the mobile device is used to access Internet and web-based services.

8. The wireless security device of claim 2, wherein the mobile device is used as a login or access control device.

9. The wireless security device of claim 2, wherein the mobile device is used to automatically initiate a phone call to one or more pre-stored numbers when instructed to do so by the paired WSD.

10. A method of creating a multi-factor authentication process by utilizing a secure link between a wireless security device (WSD) located within a close proximity of a first wireless device comprising at least a first level of authentication and the WSD being the second device providing at least a second level of authentication, for completing a desired task secured by the multi-factor authentication, the method comprising the steps of:

providing the WSD for:
  a. transmitting, by a transceiver, a secure wireless pairing information of the WSD to the first wireless device;
  b. storing, in a memory of the WSD, at least the secure pairing information of the WSD;
  c. pairing with the first wireless device using the secure pairing information
  d. storing, in the memory of the WSD, a paired password information;
  e. indicating, by an audible alarm, WSD status, the status at lease comprises pairing status, close-proximity indicator and battery condition;
  f. validating, by a second factor authentication sensor, at least presence of an authorized user possessing the paired WSD device to the first wireless device;
  g. continuously validating, by a processor of the WSD, the presence of the paired WSD in the close proximity of the first wireless device; and providing the first wireless device for:
  a. loading an application software on the first wireless device;
  b. pairing the WSD with the first wireless device;
  c. further storing the paired password information in the first wireless device;
  d. detecting the presence of the WSD within close proximity of the first wireless device via telemetry;
  e. requiring the presence of the WSD within close proximity of the first wireless device as a second factor authentication;
  f. performing the second factor authentication process of the WSD with the first wireless;
  g. granting access to the first wireless device; and
  h. completing the desired task.

11. The multi-factor authentication method of claim 10, further comprising the step of performing a third-level authentication utilizing a biometric senor on the WSD, prior to granting access to the first device.

12. The multi-factor authentication method of claim 10, wherein the desired task is performing an RFID purchase.

13. The multi-factor authentication method of claim 11, wherein the desired task is performing an RFID purchase.

14. The multi-factor authentication method of claim 10, wherein the desired task is performing email correspondence, web-based services and remote transactions.

15. The multi-factor method of claim 11, wherein the desired task is performing email correspondence, web-based services and remote transactions.

16. The multi-factor method of claim 11 wherein the desired task is utilizing the first wireless device for the purpose of identification and access to pre-stored information and databases.

17. The multi-factor method of claim 10, further comprising the step of actuating an alarm when the WSD is removed from the close proximity of the first wireless device.

18. The multi-factor method of claim 10, further comprising the step of activating one or more stress calls by the first wireless device to pre-stored phone numbers when notified to do so by the WSD.

19. The multi-factor method of claim 10, further comprising the step of validating the presence of an authorized user to a remote computing device using the first wireless device, when the paired WSD is within the close proximity of the first wireless device.

20. The multi-factor method of claim 11, further comprising the step of validating the presence of an authorized user to a remote computing device using the first wireless device, when the paired WSD is within the close proximity of the first wireless device.

21. The multi-factor method of claim 10, further comprising the step of performing a first level authentication on the first wireless device.

* * * * *